United States Patent
Kubo et al.

[11] Patent Number: 6,086,989
[45] Date of Patent: Jul. 11, 2000

[54] BIAXIALLY ORIENTED POLYESTER FILM TO BE LAMINATED ONTO A METAL PLATE AND MOLDED

[75] Inventors: Koji Kubo; Hirofumi Murooka, both of Sagamihara; Masahiko Kosuge; Manabu Kimura, both of Matsuyama, all of Japan

[73] Assignee: Teijin Limited, Tokyo, Japan

[21] Appl. No.: 09/091,190

[22] PCT Filed: Oct. 9, 1997

[86] PCT No.: PCT/JP97/03643

§ 371 Date: Jun. 10, 1998

§ 102(e) Date: Jun. 10, 1998

[87] PCT Pub. No.: WO98/16573

PCT Pub. Date: Apr. 23, 1998

[30] Foreign Application Priority Data

Oct. 11, 1996 [JP] Japan .................................. 8-269753
Jan. 23, 1997 [JP] Japan .................................. 9-010043
Jun. 9, 1997 [JP] Japan .................................. 9-150937

[51] Int. Cl.[7] .............................. B32B 27/36; B32B 31/04
[52] U.S. Cl. ......................... 428/335; 428/339; 428/458; 428/480; 428/910; 156/308.2; 264/299; 528/302; 528/308; 528/308.1; 528/308.6; 528/308.7
[58] Field of Search ...................... 428/480, 483, 428/910, 35.8, 335, 339, 458; 528/302, 305, 308, 308.1, 308.6, 308.7; 156/308.2; 264/299

[56] References Cited

FOREIGN PATENT DOCUMENTS

| | | |
|---|---|---|
| 0 586 161 | 3/1994 | European Pat. Off. . |
| 6116376 | 4/1996 | Japan . |
| 8143687 | 6/1996 | Japan . |
| 8231690 | 9/1996 | Japan . |
| 9048840 | 2/1997 | Japan . |
| 9-70935 | 3/1997 | Japan . |
| 9-71667 | 3/1997 | Japan . |

OTHER PUBLICATIONS

Abstract XP002122391 (JP 05 155991), *Database WPI*, Section Ch, Week 199329.

Abstract XP002122392 (JP 05 320377), *Database WPIU*, Section Ch, Week 199402.

*Primary Examiner*—Vivian Chen
*Attorney, Agent, or Firm*—Sughrue, Mion, Zinn, Macpeak & Seas, PLLC

[57] ABSTRACT

A biaxially oriented polyester film to be laminated onto a metal plate and molded, which comprises a copolyester, said copolyester comprising (a) terephthalic acid in an amount of 82 to 100 mol % and 2,6-naphthalenedicarboxylic acid or a combination of 2,6-naphthalenedicarboxylic acid and other dicarboxylic acids in an amount of 0 to 18 mol % of the total of all dicarboxylic acid components and (b) ethylene glycol in an amount of 82 to 100 mol % and cyclohexanedimethanol or a combination of cyclohexanedimethanol and other diols in an amount of 0 to 18 mol % of the total of all diol components, and having (c) a glass transition temperature of 78° C. or higher and (d) a melting point of 210 to 250° C. The said film has the following relationship between the highest peak temperature (Te, ° C.) of loss elastic modulus and the glass transition temperature (Tg, ° C.): $Te-Tg \leq 30$, or its content of a free dicarboxylic acid diol ester is 50 ppm or less. The said film has improved flavor retention properties for its contents taste, particularly taste and flavor retention properties after a retort treatment, while retaining excellent moldability, heat resistance, impact resistance.

25 Claims, 1 Drawing Sheet

BIAXIALLY ORIENTED POLYESTER FILM TO BE LAMINATED ONTO A METAL PLATE AND MOLDED

TECHNOLOGICAL FIELD

This invention relates to a polyester film to be laminated onto a metal plate and molded. More specifically, it relates to a polyester film to be laminated onto a metal plate and molded, which exhibits excellent moldability when a metal plate onto which the film is laminated is deep-drawn to make a can and which can give cans, such as drink cans and food cans, having excellent heat resistance, retort resistance, flavor retention properties, impact resistance and corrosion resistance.

BACKGROUND ART

Metal cans are generally coated on interior and exterior surfaces thereof to be protected from corrosion. Recently, the development of methods for obtaining corrosion resistance without using an organic solvent has been promoted for the purpose to simplify production process, improve sanitation and prevent pollution. As one of such methods, coating of a metal can with a thermoplastic resin film has been attempted.

That is, studies on a method for making cans by laminating a thermoplastic resin film onto a metal plate such as tinplate, tin-free steel or aluminum and then drawing the laminated metal plate are under way.

It is becoming clear that a copolyester film is suitable for use as this thermoplastic resin film in view of moldability, heat resistance, impact resistance and flavor retention properties. However, the polyester film does not always exhibit sufficient taste and flavor retention properties when a can coated therewith contains a drink of which very delicate taste is important, such as green tea, or mineral water which must be tasteless and unflavored, and changes in flavor and taste are detected.

Japanese Laid-open (Kokai) patent application No. 6-116376 proposes a polyester film to be laminated onto a metal plate and molded, which comprises a copolyester containing alkali metal elements and germanium element in specific amounts and has improved flavor retention properties. This film exhibits excellent taste and flavor retention properties when the container with the content is not heated, like the case of a cold pack system, but the film does not always obtain sufficient taste and flavor retention properties when the container with the content undergoes heat treatment, like the case of a retort treatment.

Japanese Laid-open (Kokai) patent application No. 8-231690 proposes a copolyester film comprising terephthalic acid as a main acid component and 1,4-cyclohexanedimethanol and ethylene glycol in a specific proportion range as diol components. Although this film has been proposed to obtain flavor retention properties for contents which require a retort treatment, it cannot obtain sufficient can making properties due to its low heat resistance.

It is an object of the present invention to provide a polyester film to be laminated onto a metal plate and molded, which has overcome the defects of conventional technology and has improved flavor retention properties for contents, particularly taste and flavor retention properties after a retort treatment, while retaining excellent moldability, heat resistance and impact resistance of a copolyester film.

Other objects and advantages of the present invention will become clear from the following description.

DISCLOSURE OF THE INVENTION

Figure 1:
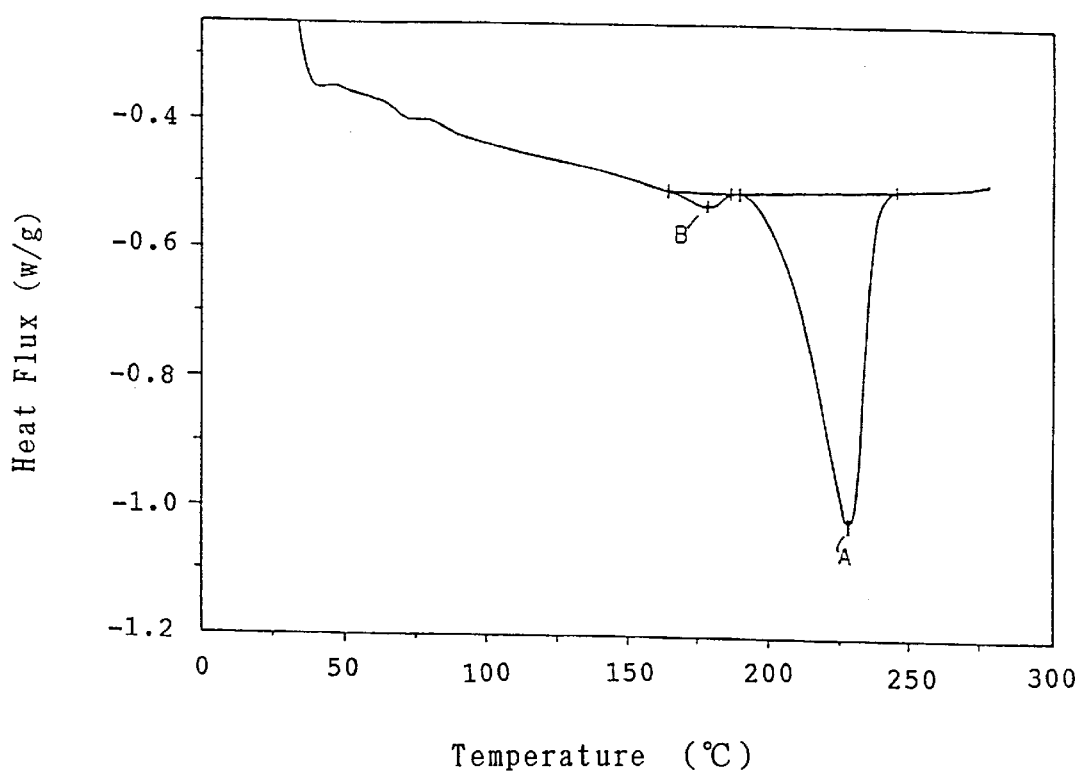
FIG. 1 shows a DSC chart.

According to the present invention, firstly, the above objects and advantages of the present invention can be attained by a biaxially oriented polyester film to be laminated onto a metal plate and molded, (A) which comprises a copolyester comprising (a) terephthalic acid in an amount of 82 to 100 mol % and 2,6-naphthalenedicarboxylic acid or a combination of 2,6-naphthalenedicarboxylic acid and other dicarboxylic acid(s) in an amount of 0 to 18 mol %, based on the whole dicarboxylic acid component and (b) ethylene glycol in an amount of 82 to 100 mol % and cyclohexanedimethanol or a combination of cyclohexanedimethanol and other diols in an amount of 0 to 18 mol %, based on the whole diol component, and having (c) a glass transition temperature of 78° C. or higher and (d) a melting point in a range of 210 to 250° C., and (B) which has the following relationship between the highest peak temperature (Te, ° C.) of loss elastic modulus and the glass transition temperature (Tg, ° C.):

$$Te-Tg \leq 30.$$

The copolyester in the present invention comprises terephthalic acid in an amount of 82 to 100 mol % and 2,6-naphthalenedicarboxylic acid or a combination of 2,6-naphthalenedicarboxylic acid and other dicarboxylic acids in an amount of 0 to 18 mol %, based on the whole dicarboxylic acid component.

Illustrative examples of the other dicarboxylic acid include aromatic dicarboxylic acids such as isophthalic acid, phthalic acid or the like; aliphatic dicarboxylic acids such as adipic acid, azelaic acid, sebacic acid, decanedicarboxylic acid or the like; alicyclic dicarboxylic acids such as cylohexanedicarboxylic acid or the like; and the like. They may be used alone or in combination of two or more.

The copolyester in the present invention comprises ethylene glycol in an amount of 82 to 100 mol % and cyclohexanedimethanol or a combination of cyclohexanedimethanol and other diols in an amount of 0 to 18 mol %, based on the whole diol component.

Illustrative examples of the other diol include aliphatic diols such as diethylene glycol, propylene glycol, neopentylglycol, butanediol, pentanediol, hexanediol or the like; alicyclic diols such as cyclohexanedimethanol or the like; aromatic diols such as bisphenol A or the like; and polyalkylene glycols such as polyethylene glycol, polypropylene glycol or the like. They may be used alone or in combination of two or more.

The above copolyester may comprise at least one or both of 2,6-naphthalenedicarboxylic acid and 1,4-cyclohexanedimethanol as a copolymer component(s).

Particularly preferably, all the dicarboxylic acid components of the copolyester consist of terephthalic acid and 2,6-naphthelenedicarboxylic acid and all the diol components consist of ethylene glycol.

The copolyester in the present invention has a glass transition temperature (Tg) of 78° C. or higher and a melting point of 210 to 250° C.

If Tg is lower than 78° C., heat resistance will deteriorate and taste and flavor retention properties after a retort treatment will degrade when the film of the present invention is laminated onto a metal plate and molded into a metal can. To increase the Tg of the copolyester of the present invention to 78° C. or higher, 2,6-naphthalenedicarboxylic acid and cyclohexanedimethanol are used as copolymer components, as described above.

The glass transition temperature (Tg) of the copolyester is preferably in the range of 78 to 90° C.

The Tg of the polyester is measured at a temperature elevation rate of 20° C./min using Du Pont Instruments 910 DSC by placing a 20 mg of a film sample in a DSC measurement pan, melting under heating the film sample on a heating stage at 290° C. for 5 minutes, and quenching to solidify the pan on an aluminum foil placed on ice.

If the melting point is lower than 210° C., the heat resistance of the polymer will deteriorate, while if the melting point is higher than 245° C., the crystallinity of the polymer will be too high with the result of impaired moldability.

The melting point of the copolyester is preferably in the range of 210 to 245° C.

The melting point of copolyethylene terephthalate is measured in accordance with a method for obtaining a melting peak at a temperature elevation rate of 20° C./min using Du Pont Instruments 910 DSC. The quantity of a sample is 20 mg.

The intrinsic viscosity (in orthochlorophenol, at 35° C.) of the copolyester is preferably in the range of 0.52 to 1.50, more preferably 0.57 to 1.00, particularly preferably 0.60 to 0.80. If the intrinsic viscosity is less than 0.52, impact resistance may be insufficient disadvantageously. On the other hand, if the intrinsic viscosity is more than 1.50, moldability may be impaired.

Although the copolyester in the present invention is not limited by a production method thereof, preferred methods for producing a desired copolyester include a method which comprises subjecting terephthalic acid, ethylene glycol and a copolymerizable component to an esterification reaction and then polycondensing the reaction product until an intended degree of polymerization is achieved, or a method which comprises subjecting terephthalic acid dimethyl ester, ethylene glycol and a copolymerizable component to an ester exchange reaction and then polycondensing the reaction product until an intended degree of polymerization is achieved. The copolyester obtained by one of the above methods (melt polymerization) can be converted to a polymer having a higher degree of polymerization by being polymerized in a solid phase (solid-phase polymerization) as required.

The above copolyester may contain such additives as an antioxidant, heat stabilizer, viscosity control agent, plasticizer, hue modifier, lubricant, nucleating agent and ultraviolet absorber, as required.

Preferred examples of the catalyst used for the above polycondensation reaction include antimony compounds (Sb compounds), titanium compounds (Ti compounds), germanium compounds (Ge compounds) and the like. Out of these, germanium compounds and titanium compounds are more preferred in view of the flavor retention properties of a film. Preferred titanium compounds include titanium tetrabutoxide and titanium acetate. Preferred germanium compounds include (a) amorphous germanium oxide, (b) fine crystalline germanium oxide, (c) a solution containing germanium oxide dissolved in glycol in the presence of an alkali metal, alkaline earth metal or compound thereof, (d) a solution containing germanium oxide dissolved in water, and the like. The amount of the catalyst used may be an amount generally employed.

The copolyester preferably contains a lubricant to improve the wind-up properties of a film. The lubricant may be organic or inorganic, but, preferably, is inorganic. Illustrative examples of the inorganic lubricant include silica, alumina, titanium oxide, calcium carbonate, barium sulfate and the like, and those of the organic lubricant include silicone resin particles, crosslinked polystyrene particles and the like. The lubricant is preferably a monodispersed lubricant having a particle diameter ratio (major diameter/minor diameter) of 1.0 to 1.2 in view of pin hole resistance. Illustrative examples of the monodispersed lubricant include spherical silica, spherical silicone resin particles, globular crosslinked polystyrene and the like.

The particle diameter and amount of the lubricant may be determined by the wind-up properties, pin hole resistance and taste and flavor retention properties of a film. That is, the wind-up properties can be secured by adding 0.06 wt % or more and 0.25 wt % or less of silica having an average particle diameter of 1.5 $\mu$m, or 0.1 wt % or more and 0.45 wt % or less of silica having an average particle diameter of 0.8 $\mu$m without impairing taste and flavor retention properties.

The lubricant is not limited to the above externally added particles but may be internally deposited particles obtained by depositing in a reaction step a part or whole of the catalyst used in the production of a polyester, for example. It is also possible to use both the externally added particles and the internally deposited particles.

As the polyester film of the present invention suitable for use in a food can or drink can in particular, the smaller the amounts of substances dissolved out or dispersed from the film the better the polyester film is. However, it is substantially impossible to remove such substances completely. Hence, to use the polyester film of the present invention for a food can or drink can, for example, the quantity per 1 inch$^2$ of the film of the substances extracted with ion exchange water at 121° C. for 2 hours is preferably 0.5 mg or less, more preferably 0.1 mg or less.

The film of the present invention comprises the above copolyester and is biaxially oriented and heat set for use. The highest peak temperature (Te) of loss elastic modulus and glass transition temperature measured by DSC of the polyester film are required to satisfy the following expression.

$$Te-Tg \leq 30$$

If the value of Te–Tg exceeds 30, the molecular orientation and crystallinity of the film will be too high with the result of greatly deteriorated moldability. The Te value, which depends on a copolymer component and copolymerization ratio, is preferably controlled by film formation conditions, particularly stretch ratios or temperature in the biaxial stretching.

The relationship between the highest peak temperature of loss elastic modulus (Te) and the glass transition temperature (Tg) is preferably $15 \leq Te-Tg \leq 25$.

In this expression, Te is obtained at a measurement frequency of 10 Hz and a dynamic displacement of $\pm 25 \times 10^{-4}$ cm using a dynamic viscoelasticity measuring instrument.

The polyester film of the present invention preferably has the following relationship between a surface (100) and a surface (1$\bar{1}$0) which are parallel to the surface of the film:

$$0.10 \leq I(1\bar{1}0)/I(100) \leq 0.40$$

wherein I(1$\bar{1}$0) is an X-ray diffraction intensity obtained by the surface (1$\bar{1}$0) and I(100) is an X-ray diffraction intensity obtained by the surface (100).

If this intensity ratio (I(1$\bar{1}$0)/I(100)) is less than 0.10, moldability will be insufficient. On the other hand, if the intensity ratio is more than 0.40, heat resistance will be liable to deteriorate.

Further, the polyester film of the present invention preferably has a refractive index of 1.620 to 1.670, more preferably 1.625 to 1.665, in all the film plane directions. In deep drawing or ironing which are often used in a can making fabrication, deformation must be uniform in all directions and any portion of the film must be able to follow this deformation. If the refractive index in all the film plane directions is less than 1.620, moldability will be satisfactory but heat resistance will be apt to be poor. On the other hand, if the refractive index is more than 1.670, the film will be liable to cause whitening or rupture during deep drawing due to poor moldability.

Further, the polyester film of the present invention preferably has a plane orientation coefficient of 0.100 to 0.150, more preferably 0.110 to 0.140.

If the plane orientation coefficient is less than 0.100, the film will be cracked disadvantageously when deep drawn at a high draw ratio. On the other hand, if the plane orientation coefficient is more than 0.150, the film will undergo rupture by deep drawing and cannot be molded.

The "plane orientation coefficient" as used herein is defined by the following equation.

$$f=[(n_x+n_y)/2]-n_z$$

wherein f is a plane orientation coefficient, and $n_x$, $n_y$ and $n_z$ are refractive indices in transverse, longitudinal and thickness directions of the film, respectively.

The refractive index is measured in accordance with the following method.

A polarization analyzer is attached to an ocular side of an Abbe's refractometer to measure each refractive index with a monochromatic NaD ray. Methylene iodide is used as a mounting liquid and the measurement temperature is 25° C.

The polyester film of the present invention preferably has a peak (called "sub-peak"), which is different from a melting peak, at a temperature range of 150 to 205° C., more preferably 155 to 200° C., particularly preferably 160 to 195° C., in the DSC. This sub-peak contributes to the stability of film quality after the film is heat laminated onto a metal plate. If the sub-peak is present at a temperature lower than 150° C., a bottom portion of a can will be liable to be embrittled when the heat lamination temperature onto a metal plate is raised and the film will be easily broken upon molding when the heat lamination temperature is reduced. Therefore, it is difficult to make a good can by controlling the heat lamination temperature. If the sub-peak is present at a temperature higher than 205° C., the film will be easily broken at any heat lamination temperature in a can manufacturing, thereby making it difficult to make a can.

The sub-peak temperature is measured in accordance with a method for obtaining a sub-peak with a sample quantity of 20 mg and at a temperature elevation rate of 20° C./min using the Du Pont Instruments 910 DSC, like the measurement of the above melting point. The term "sub-peak" as used herein means a small peak B which appears on a low temperature side of a melting peak A of a DSC chart as shown in FIG. 1.

The polyester film of the present invention preferably has within a film plane direction the following relationship is established between tensile stress (F40, kgf/mm$^2$) at a 40% elongation at 100° C. and tensile stress (F120, kgf/mm$^2$) at a 120% elongation at 100° C.:

$$0.6 \leq F40/F120 \leq 0.8.$$

The tensile stresses (kg/mm$^2$) at 40% and 120% elongations at 100° C. are defined as tensile stresses (kg/mm$^2$) at 40% and 120% elongations, respectively, when a 10 mm-wide strip-shaped sample is pulled under conditions of a measurement temperature of 100° C., a chuck interval of 10 cm and a stress rate of 10 cm/min, using a tensile tester equipped with a heating probe. This direction often coincides with the extrusion direction of the film.

The tensile stress at 100° C. can be controlled by the kind and quantity of a copolymer component or the stretching conditions of the film. If F40/F120 is less than 0.6, moldability will be liable to deteriorate due to a great increase in stress caused by molding, while if F40/F120 is more than 0.8, impact resistance will be apt to deteriorate since the film tends to be embrittled.

The polyester film of the present invention is produced by melt extruding a copolyester, quenching the extrudate to obtain an unstretched film, biaxially stretching the unstretched film to 2.5 to 3.8 times, preferably 2.7 to 3.6 times, in a longitudinal direction at a temperature of 95 to 150° C., preferably 110 to 140° C. and to 2.7 to 4.0 times, preferably 2.8 to 3.8 times, in a transverse direction at a temperature of 100 to 150° C., preferably 110 to 140° C., and heat setting the biaxially oriented film at 140 to 230° C., preferably 140 to 210° C. These longitudinal stretch ratio, transverse stretch ratio and heat-setting temperature are suitably selected to achieve predetermined values of the above characteristic properties.

The refractive index in a film thickness direction of the polyester film is preferably 1.500 to 1.545, more preferably 1.505 to 1.530. If the refractive index is too low, moldability will be insufficient, while if the refractive index is too high, heat resistance may deteriorate because the film has a nearly amorphous structure.

According to the present invention, there is provided a biaxially oriented polyester film to be laminated onto a metal plate and molded, which has improved taste and flavor retention properties after a retort treatment, in particular.

According to studies conducted by the inventors of the present invention, it has been further found that though a film is made from a copolyester identical to the above copolyester used in the present invention but above relationship between Te and Tg is not always established, taste and flavor retention properties after a retort treatment can be improved like the above film when the content of a free dicarboxylic acid diol ester is 50 ppm or less.

Therefore, according to the present invention, secondly, there is provided a biaxially oriented polyester film to be laminated onto a metal plate and molded (to be referred to as "second polyester film of the present invention" hereinafter), (A) which comprises a copolyester comprising (a) terephthalic acid in an amount of 82 to 100 mol % and 2,6-naphthalenedicarboxylic acid or a combination of 2,6-naphthalenedicarboxylic acid and other dicarboxylic acid(s) in an amount of 0 to 18 mol %, based on the whole dicarboxylic acid component, and (b) ethylene glycol in an amount of 82 to 100 mol % and cyclohexanedimethanol or a combination of cyclohexanedimethanol and other diol in an amount of 0 to 18 mol %, based on the whole component, and having (c) a glass transition temperature of 78° C. or higher and (d) a melting point in a range of 210 to 250° C., and (B') which contains a free dicarboxylic acid diol ester in an amount of 50 ppm or less.

The free dicarboxylic acid diol ester (may be referred to as "free glycol ester" hereinafter) contained in the second polyester film of the present invention is free bis(β-hydroxyethyl)terephthalate (may be abbreviated as BHET hereinafter) and free bis(β-hydroxyethyl)naphthalate (may be abbreviated as BHEN hereinafter) when the acid components of the copolyester are terephthalic acid and 2,6-naphthalenedicarboxylic acid and the glycol component is ethylene glycol. Therefore, in this case, the content of the dicarboxylic acid diol ester contained in the film is the total amount of the above BHET and BHEN contained in the film. In particular, the content of BHEN is small in the range of composition of the polymer-constituting components in the present invention. Particularly when the molar ratio of acid components (terephthalic acid/2,6-naphthalenedicarboxylic acid) is in the range of 85/15 to 97/3, the content of BHEN contained in the film is below the quantitative detection limit and only BHET is substantially detected as a free glycol ester. Further, the total content of free glycol esters contained in the film can be reduced advantageously by selecting the composition of polymer-constituting components such that only BHET is substantially detected as a free glycol ester.

The content of this free glycol ester contained in the film must be reduced to 50 ppm or less, preferably 30 ppm or less, more preferably 20 ppm or less.

If the content of the free glycol ester contained in the second polyester film of the present invention is more than 50 ppm, the taste and flavor retention properties of a can content after a retort sterilization treatment will greatly degrade. To reduce the amount of the free glycol ester contained in the polyester film to 50 ppm or less, the above-described range of composition of polymer-constituting components must be satisfied.

Although the second polyester film of the present invention is not limited by a process for producing the copolyester, it is preferred in view of taste and flavor retention properties that the total amount of alkali metal elements contained in the film should satisfy $A \leq 5$ (ppm) (A: total amount of alkali metal elements). The total amount of alkali metal elements is the sum of ppm values of Li, Na and K elements quantitatively determined by atomic absorption analysis.

It is already known that when the total amount of the alkali metal elements is 5 ppm or less, the amount of an ether glycol by-produced in the production of a copolyester, particularly the amount of by-produced diethylene glycol will increase, the heat resistance of the polyester film will deteriorate, and further the productivity of an electrostatic impression casting process for a polyester film will lower. It has been found from studies conducted by the inventors of the present invention, however, that the amount of the by-produced ether glycol in the production of a copolyester, particularly the amount of the by-produced diethylene glycol can be controlled by optimizing the amount of a metal compound as a catalyst and conditions for esterification or ester exchange reaction and that a reduction in the productivity of the electrostatic application casting process for a polyester film can be suppressed by limiting the ratio of the amount of a catalytic metal element derived from the metal compound to the amount of a phosphorus element derived from a phosphorus compound in the film to a certain range.

The "catalytic metal element" referred to in the present invention is the one derived from a metal compound which is used as a reaction catalyst. This metal element is present in the copolyester in a state dissolved therein and must be distinguished from metal elements contained in lubricant particles. The "phosphorus element" is the one derived from a phosphorus compound that is used to deactivate the catalyst or as a stabilizer for the copolyester.

In the second polyester film of the present invention, the sum of the concentration of a catalytic metal element (M) and the concentration of a phosphorus element (P) remaining in the film is preferably in the range of $20 \leq (M+P) \leq 55$ (mmol %). If (M+P) is less than 20 mmol %, the productivity of the above-described electrostatic application casting process for a copolyester will lower. If (M+P) is more than 55 mmol %, heat resistance may deteriorate due to an increase in the amount of the by-produced ether glycol.

Further, the second polyester film of the present invention preferably has the ratio of the concentration of the catalytic metal element (M) to the concentration of the phosphorus element remaining in the film in the range of $1 \leq (M/P) \leq 5$ (mmol %/mmol %). If M/P is less than 1 or more than 5, the balance between the catalytic metal element and the phosphorus element will be lost and an excessive amount of the phosphorus element or the catalytic metal element will be present in the polymer, whereby heat stability may deteriorate.

The second polyester film of the present invention preferably has the catalytic metal element remaining in the film is in the range of $10 \leq M \leq 35$ (mmol %). If M is less than 10 mmol %, it will be difficult to obtain a copolyester having a sufficient degree of polymerization and characteristic properties such as impact resistance may deteriorate. If M is more than 35 mmol %, heat stability may deteriorate.

The copolyester of the present invention comprises ethylene glycol preferably in an amount of 90 mol % or more of the total of all the diol components and diethylene glycol copolymerized of copolymer components preferably in an amount of 5 mol % or less, more preferably 4 mol % or less, based on the whole diol component. If the amount is more than 5 mol %, heat resistance may deteriorate. Here, the diethylene glycol includes diethylene glycol by-produced in the production of the copolyester comprising ethylene glycol as a glycol component. The amount of diethylene glycol copolymerized is preferably 0.5 mol % or more (based on the whole glycol component) in view of the production of the copolyester.

The intrinsic viscosity of the copolyester is preferably in the range of 0.5 to 0.8 dl/g.

In the second polyester film of the present invention, an extract per 1 inch$^2$ of the film is preferably 0.1 mg or less when immersed in ion exchange water and subjected to an extraction treatment at 125° C. for 1 hour.

The second polyester film of the present invention preferably has the following relationship between Te and Tg, like the above polyester of the present invention.

Te–Tg≦30.

It should be understood that, as for what is not described herein, the second polyester film of the present invention has the same properties or performance as the above polyester film.

All the polyester films of the present invention preferably have a thickness of 6 to 75 μm, more preferably 8 to 75 μm, particularly preferably 10 to 50 μm. If the thickness is less than 6 μm, the film will be easily broken at the time of molding, while the thickness is more than 75 μm, the film will have excess quality, thus uneconomically.

The metal plate to be laminated with the polyester film of the present invention, particularly a metal plate for a can making, is advantageously a sheet of tinplate, tin-free steel, aluminum or the like. The polyester film can be laminated onto the metal plate by the following methods.

(1) The metal plate is heated at a temperature higher than the melting point of the film, laminated onto the film and cooled to make a surface layer portion (thin layer portion) of the film in contact with the metal plate amorphous so as to intimately bond it to the metal plate.

(2) A primer is, in advance, coated on the film to form an adhesive layer and the film is laminated onto the metal plate in such a manner that the adhesive layer is bonded to the metal plate. Known resin adhesives such as epoxy adhesives, epoxy-ester adhesives and alkyd adhesives can be used to form the adhesive layer.

BEST EMBODIMENT FOR PRACTICING THE INVENTION

The following examples are given to further illustrate the present invention. Characteristic properties in the examples were measured in accordance with the following methods.

(1) Intrinsic Viscosity of Polyester

Measured in ortho-chlorophenol at 35° C.

(2) Melting Point of Polyester

Using Du Pont Instruments 910 DSC, a melting peak of a sample is obtained at a temperature elevation rate of 20° C./min. The amount of the sample is 20 mg.

(3) Glass Transition Temperature (Tg) of Polyester

A 20 mg film sample is placed in a DSC measurement pan and molten by heating on a heating stage at 290° C. for 5 minutes, the sample pan was quickly quench-solidified on an aluminum foil laid on ice, and a glass transition point is obtained at a temperature elevation rate of 20° C./min using Du Pont Instruments 910 DSC.

(4) Highest Peak Temperature (Te) of Loss Elastic Modulus of Film

The loss elastic modulus is obtained at a dynamic displacement of $\pm 25 \times 10^{-4}$ cm and a measurement frequency of 10 Hz using a dynamic visco-elasticity measuring instrument, and the highest peak temperature at this point is taken.

(5) Deep Drawability

A film was laminated on both sides of a 0.25 mm-thick tin-free steel sheet heated at a temperature higher than the melting point of a polyester, cooled with water and cut into a 150 mm-diameter disk-like piece. The disk-like piece was deep drawn using a drawing dice and punch in four stages to form a 55 mm-diameter container having no seam joint on the side surface (to be called "can" hereinafter). This can was observed and tested for the following items, which are evaluated based on the following criteria.

(a) Deep Drawability-1

○: The film is normal and the molded film is not whitened or ruptured.

Δ: A top portion of the can of the film is whitened.

X : Part of the film is ruptured.

(b) Deep Drawability-2

○: The film is molded properly and exhibits a current value of 0.2 mA or less in a corrosion prevention test on the film laminated on the interior surface of the can. (The current value is measured when the can is charged with an 1% NaCl aqueous solution, an electrode is inserted into the can, and a voltage of 6V is applied with the can used as an anode. This test is referred to as "ERV test" hereinafter.)

X: The film is normal but exhibits a current value of 0.2 mA or more in the ERV test. When a portion through which electricity passes is magnified for observation, a pinhole-like crack which starts from the coarse lubricant of the film is observed.

(6) Impact Resistance

Well deep drawn cans were filled with water to full and cooled to 0° C., and 10 cans were dropped for each test onto a polyvinyl chloride-tiled floor from a height of 30 cm. Thereafter, the inside of each can was subjected to the EVR test.

○: The films of all the 10 cans gave a current value of 0.2 mA or less.

Δ: The films of 1 to 5 cans gave a current value of 0.2 mA or more.

X: The films of 6 cans or more gave a current value of 0.2 mA or more, or cracks in the film was already observed after dropping.

(7) Resistance to Heat Embrittlement

Well deep drawn cans were heated at 200° C. for 5 minutes and evaluated for impact resistance in the same manner as described in (3).

○: The films of all the 10 cans gave a current value of 0.2 mA or less.

Δ: The films of 1 to 5 cans gave a current value of 0.2 mA or more.

X: The films of 6 cans or more gave a current value of 0.2 mA or more, or cracks in the film was already observed after heated at 200° C. for 5 minutes.

(8) Retort Resistance

Well deep drawn cans were filled with water to full, subjected to a retort treatment at 120° C. for 1 hour in a steam sterilizer and thereafter kept at 50° C. for 30 days. Ten cans were dropped for each test on a polypolyvinyl chloride-tiled floor from a height of 50 cm for each test, and the inside of each can was subjected to the EVR test.

○: The films of all the 10 cans gave a current value of 0.2 mA or less.

Δ: The films of 1 to 5 cans gave a current value of 0.2 mA or more.

X : The films of 6 cans or more gave a current value of 0.2 mA or more, or cracks in the film were already observed after dropping.

(9) Taste Retention Properties-1

Well deep drawn cans are filled with ion exchange water to full and kept at normal temperature (20° C.) for 30 days. A drink test is made on 30 panelists using the immersion solution to be compared with ion exchange water as reference. The taste retention properties of the film are evaluated based on the following criteria.

◎: 3 or less out of 30 panelists feel a change in taste in comparison with the reference solution.

○: 4 to 6 out of 30 panelists feel a change in taste in comparison with the reference solution.

Δ: 7 to 9 out of 30 panelists feel a change in taste in comparison with the reference solution.

X: 10 or more out of 30 panelists feel a change in taste in comparison with the reference solution.

(10) Taste Retention Properties-2

Well deep drawn cans are filled with ion exchange water to full, subjected to are tort treatment in a steam sterilizer at 120° C. for 1 hour and thereafter kept at normal temperature (20° C.) for 30 days. A drink test is made on 30 panelists using the immersion solution to be compared with ion exchange water as reference. The taste retention properties of the film are evaluated based on the following criteria.

◎: 3 or less out of 30 panelists feel a change in taste in comparison with the reference solution.

○: 4 to 6 out of 30 panelists feel a change in taste in comparison with the reference solution.

Δ: 7 to 9 out of 30 panelists feel a change in taste in comparison with the reference solution.

X: 10 or more out of 30 panelists feel a change in taste in comparison with the reference solution.

(11) Tensile Stresses (F40, F120) at 40% and 120% Elongations at 100° C.

Stresses (kg/mm$^2$) at 40% and 120% elongations were obtained when a tensile test was made on a 10 mm-wide strip-type sample at a measurement temperature of 100° C., a chuck interval of 10 cm and a tensile rate of 10 cm/min using a tensile tester equipped with a heating probe (Tensilon Universal Tensile Tester of Toyo Baldwin Co., Ltd).

(12) X-ray Diffraction Intensity Ratio

The X-ray diffraction intensity ratio is obtained from $(I(1\bar{1}0))/(I(100))$ by measuring an X-ray diffraction intensity $(I(100))$ obtained by a surface (100) parallel to the surface of a film and an X-ray diffraction intensity $(I(1\bar{1}0))$ obtained by a surface $(1\bar{1}0)$ parallel to the surface of the film, in accordance with a multiplex peel separation method using the Pseudo Voight peel model under conditions of a divergent slit of ½°, a scattering slit of ½°, a light receiving slit of 0.15 mm and a scanning speed of 1,000° /min using CuK-α as an X-ray source.

(13) Refractive Indices in Film Plane Direction and Film Thickness Direction

A polarization analyzer is attach ed to an oscular side of an Abbe refractometer to measure refractive indices in these directions with a monochromatic NaD ray. Methylene iodide is used as a mounting solution and the measurement temperature is 25° C.

(14) Plane Orientation Coefficient

A polarization analyzer is attached to an oscular side of an Abbe refractometer to measure refractive indices $n_x$, $n_y$ and $n_z$ in breadthwise, lengthwise and thickness directions, respectively, of the film with a monochromatic NaD ray, and a plane orientation coefficient f is obtained from the following equation.

$$f=[(n_x+n_y)/2]-n_z$$

(15) Sub-peak in DSC

The sub-peak is obtained at a temperature elevation rate of 20° C./min using Du Pont Instruments 910 DSC. The amount of a sample is 20 mg.

(16) Quantity of Free Glycol Ester

500 Mg of a polyester film was dissolved in 3 ml of hexafluoroisopropanol. 10 ml of methanol is added to this solution to re-precipitate a sample polymer and a filtrate after filtration is used directly to determine the quantity of a free glycol ester by liquid chromatography, thereby obtaining its concentration in the film. Since the quantity of free BHEN in Examples of the present invention is equal to or less than the limit of quantitative determination, the quantity of a free glycol ester substantially indicates the quantity of free BHET.

(17) Quantity of Extract with Water-1

A polyester film was immersed in ion exchange water and subjected to an extraction treatment at 121° C. for 1 hour. The quantity of an extract contained in this immersion solution was determined to obtain the quantity of an extract per 1 inch$^2$ of the film.

(18) Quantity of Extract with Water-2

A polyester film was immersed in ion exchange water and subjected to an extraction treatment at 125° C. for 1 hour. The quantity of an extract contained in this immersion solution was determined to obtain the quantity of an extract per 1 inch$^2$ of the film.

(19) Quantities of Alkali Metals

After a film sample is dissolved in ortho-chlorophenol, an extraction operation is carried out with 0.5 N hydrochloric acid. The quantities of Na, K and Li contained in this extract are respectively determined by atomic absorption analysis.

(20) Quantities of Catalytic Metal Element and Phosphorus Element

A film sample was molten by heating at 240° C. to prepare a round disk and the quantities of catalytic metal element and phosphorus element were determined by X-ray fluorescent analysis.

(21) Lamination Properties

A polyester film was laminated on a 0.25 mm-thick tin-free steel sheet heated at a temperature higher than the melting point of a polyester and cooled to obtain a film-coated steel sheet. This film-coated steel sheet was observed and evaluated for its lamination properties based on the following criteria.

[criteria for bubbles and wrinkles]
○: No bubbles and no wrinkles are observed.
Δ: Two or three bubbles or wrinkles are observed per 10 cm.
X : Many bubbles and wrinkles are observed.
[criteria for heat shrinkage]
○: shrinkage of less than 2%
Δ: shrinkage of 2% or more and less than 5%
X: shrinkage of 5% or more EXAMPLES 1 to 7 AND COMPARATIVE EXAMPLES 1 to 3

Copolyethylene terephthalates (containing 0.2 wt % of spherical silica having an intrinsic viscosity of 0.64, a particle diameter ratio of 1.1 and an average particle diameter of 0.5 μm) prepared by copolymerizing components shown in Table 1 were dried, melt extruded and quenched to be solidified to obtain unstretched films. The unstretched films were stretched in a longitudinal direction at stretch ratios and temperatures shown in Table 1 and then in a transverse direction at stretch ratios and temperatures shown in Table 1, and further heat set at 180° C. to obtain biaxially oriented polyester films.

The thickness of each of the obtained films was 25 μm. The glass transition temperatures (Tg) and highest peak temperatures of loss elastic moduli (Te) of the films are shown in Table 1, and the evaluation results are shown in Table 2.

TABLE 1

| | Copolymer component | Copolymerization ratio (mol %) | Tm (° C.) | Longitudinal stretching conditions | | Transverse stretching conditions | | Tg (° C.) | Te (° C.) | Te-Tg (° C.) |
|---|---|---|---|---|---|---|---|---|---|---|
| | | | | Stretch ratio | Temperature (° C.) | Stretch ratio | Temperature (° C.) | | | |
| Ex. 1 | NDC | 18 | 213 | 3.2 | 110 | 3.3 | 120 | 83 | 105 | 17 |
| Ex. 2 | NDC | 10 | 232 | 3.0 | 115 | 3.1 | 125 | 81 | 100 | 19 |
| Ex. 3 | NDC | 10 | 232 | 3.3 | 110 | 3.5 | 120 | 81 | 109 | 28 |
| Ex. 4 | NDC | 6 | 242 | 3.0 | 120 | 3.1 | 130 | 80 | 108 | 28 |
| Ex. 5 | CHDM | 12 | 229 | 3.0 | 110 | 3.1 | 120 | 79 | 102 | 23 |
| Ex. 6 | CHDM | 18 | 212 | 3.2 | 100 | 3.3 | 110 | 80 | 95 | 15 |
| Ex. 7 | IA NDC | 6 6 | 228 | 3.0 | 110 | 3.1 | 120 | 78 | 98 | 20 |
| C. Ex. 1 | IA | 6 | 243 | 3.0 | 110 | 3.1 | 120 | 76 | 103 | 27 |
| C. Ex. 2 | NDC | 20 | 208 | 3.2 | 100 | 3.3 | 110 | 84 | 97 | 13 |
| C. Ex. 3 | NDC | 10 | 232 | 3.2 | 100 | 3.3 | 110 | 81 | 112 | 32 |

Ex.: Example, C. Ex.: Comparative Example
Copolymer component
IA—Isophthalic acid
NDC—2,6-naphthalenedicarboxylic acid
CHDM—1,4-cyclohexanedimethanol
(These shall apply to the following Tables.)

TABLE 2

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| Ex. 1 | ○ | ○ | ○ | ○ | ○ | ⊙ | ○ | ○ |
| Ex. 2 | ○ | ○ | ○ | ○ | ○ | ⊙ | ○ | ⊙ |
| Ex. 3 | ○ | ○ | ○ | ○ | ○ | ⊙ | ⊙ | ⊙ |
| Ex. 4 | ○ | ○ | ○ | ○ | ○ | ⊙ | ⊙ | ⊙ |
| Ex. 5 | ○ | ○ | ○ | ○ | ○ | ○ | ○ | ○ |
| Ex. 6 | ○ | ○ | ○ | ○ | ○ | ○ | ○ | ○ |
| Ex. 7 | ○ | ○ | ○ | ○ | ○ | ○ | ○ | ○ |
| C. Ex. 1 | ○ | ○ | ○ | ○ | ○ | ⊙ | △ | △ |
| C. Ex. 2 | ○ | ○ | ○ | ○ | ○ | ○ | △ | △ |
| C. Ex. 3 | ○ | × | — | — | — | — | — | × |

"—" in the Table indicates that evaluation was not made.

As is apparent from the evaluation results of Table 2, cans made by using the polyester films of the present invention are satisfactory in view of deep drawability, resistance to heat embrittlement, retort resistance and impact resistance and excellent in flavor retention properties, particularly taste and flavor retention properties after a retort treatment.

EXAMPLES 8 TO 13 AND COMPARATIVE EXAMPLE 4

Copolyethylene terephthalates (containing 0.2 wt % of spherical silica having an intrinsic viscosity of 0.64, a particle diameter ratio of 1.1 and an average particle diameter of 0.5 μm) prepared by copolymerizing components shown in Table 3 were dried, melt extruded and quenched to be solidified to obtain unstretched films. The unstretched films were stretched in a longitudinal direction at stretch ratios and temperatures shown in Table 3 and then in a transverse direction at stretch ratios and temperatures shown in Table 3, and further heat set at 170° C. to obtain biaxially oriented polyester films.

The thickness of each of the obtained films was 25 μm. The glass transition temperatures (Tg), highest peak temperature of loss elastic moduli (Te), X-ray diffraction intensity ratios, refractive indices in a film plane direction, refractive indices in a film thickness direction and quantities of extracts with water-1 of the films are shown in Table 4, and the evaluation results are shown in Table 5.

TABLE 3

| | Copolymer component | Copolymerization ratio (mol %) | Melting point (° C.) | Longitudinal stretching conditions | | Transverse stretching conditions | |
|---|---|---|---|---|---|---|---|
| | | | | Stretch ratio | Temperature (° C.) | Stretch ratio | Temperature (° C.) |
| C. Ex. 4 | NDC | 20 | 208 | 3.5 | 105 | 3.6 | 115 |
| Ex. 8 | NDC | 18 | 213 | 3.3 | 100 | 3.5 | 110 |
| Ex. 9 | NDC | 10 | 232 | 3.2 | 115 | 3.3 | 125 |
| Ex. 10 | NbC | 6 | 242 | 3.0 | 130 | 3.1 | 135 |
| Ex. 11 | CHDM | 12 | 229 | 3.2 | 115 | 3.3 | 125 |
| Ex. 12 | IA<br>NDC | 6<br>6 | 228 | 3.2 | 120 | 3.3 | 130 |

TABLE 4

| | Tg (° C.) | Te (° C.) | Te-Tg (° C.) | X-ray diffraction intensity ratio | Refractive index | | Quantity of extract with water-1 (mg/inch$^2$) |
|---|---|---|---|---|---|---|---|
| | | | | | Film plane direction (Max/Min) | Thickness direction | |
| C. Ex. 4 | 84 | 100 | 16 | 0.38 | 1.652/1.638 | 1.545 | 0.20 |
| Ex. 8 | 83 | 103 | 20 | 0.35 | 1.654/1.635 | 1.542 | 0.16 |
| Ex. 9 | 81 | 107 | 26 | 0.13 | 1.659/1.648 | 1.517 | 0.10 |
| Ex. 10 | 80 | 107 | 27 | 0.15 | 1.652/1.645 | 1.514 | 0.10 |
| Ex. 11 | 79 | 104 | 25 | 0.22 | 1.642/1.634 | 1.518 | 0.14 |
| Ex. 12 | 78 | 100 | 22 | 0.23 | 1.645/1.638 | 1.521 | 0.20 |

TABLE 5

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| C. Ex. 4 | ◯ | ◯ | ◯ | ◯ | ◯ | ◯ | Δ | Δ |
| Ex. 8 | ◯ | ◯ | ◯ | ◯ | ◯ | ⊚ | ◯ | ⊚ |
| Ex. 9 | ◯ | ◯ | ◯ | ◯ | ◯ | ⊚ | ⊚ | ⊚ |
| Ex. 10 | ◯ | ◯ | ◯ | ◯ | ◯ | ⊚ | ⊚ | ⊚ |
| Ex. 11 | ◯ | ◯ | ◯ | ◯ | ◯ | ◯ | ◯ | ◯ |
| Ex. 12 | ◯ | ◯ | ◯ | ◯ | ◯ | ◯ | ◯ | ◯ |

EXAMPLES 13 AND 14 AND COMPARATIVE EXAMPLES 5 AND 6

Copolyethylene terephthalates (containing 0.2 wt % of spherical silica having an intrinsic viscosity of 0.62, a particle diameter ratio of 1.1 and an average particle diameter of 0.5 μm) prepared by copolymerizing components shown in Table 6 were melt extruded and quenched to be solidified to obtain unstretched films. The unstretched films were stretched and heat set under conditions shown in Table 4 to obtain biaxially oriented polyester films.

The thickness of each of the Obtained films was 25 μm. The glass transition temperatures (Tg), highest peak temperature of loss elastic moduli (Te), X-ray diffraction intensity ratios, refractive indices in a film plane direction, refractive indices in a film thickness direction and quantities of extracts with water-1 of the films are shown in Table 7.

The evaluation results are shown in Table 8. The films of the present invention which had a Tg of 78° C. or higher and a Te–Tg of 30° C. or lower (Examples 13 and 14) obtained good results whereas the film which had a Tg of lower than 78° C. (Comparative Example 5) had poor heat resistance and taste and flavor retention properties after a retort treatment and the film which had a Te–Tg of higher than 30° C. (Comparative Example 6) had poor moldability.

TABLE 6

|  | Copolymer component | Copolymerization ratio (mol %) | Melting point (° C.) | Longitudinal stretching conditions | | Transverse stretching conditions | | Heat setting temperature (° C.) |
|---|---|---|---|---|---|---|---|---|
|  |  |  |  | Stretch ratio | Temperature (° C.) | Stretch ratio | Temperature (° C.) |  |
| C. Ex. 5 | IA<br>NDC | 8<br>4 | 228 | 3.0 | 110 | 3.1 | 115 | 180 |
| Ex. 13 | IA<br>NDC | 4<br>8 | 228 | 3.1 | 115 | 3.2 | 120 | 180 |
| Ex. 14 | NDC | 10 | 232 | 3.2 | 105 | 3.3 | 115 | 190 |
| C. Ex. 6 | NDC | 10 | 232 | 3.4 | 120 | 3.6 | 130 | 190 |

TABLE 7

|  | Tg (° C.) | Te (° C.) | Te-Tg (° C.) | X-ray diffraction intensity ratio | Refractive index | | Quantity of extract with water-1 (mg/inch$^2$) |
|---|---|---|---|---|---|---|---|
|  |  |  |  |  | Film plane direction (Max/Min) | Thickness direction |  |
| C. Ex. 5 | 77 | 98 | 21 | 0.25 | 1.642/1.632 | 1.521 | 0.23 |
| Ex. 13 | 79 | 102 | 23 | 0.24 | 1.644/1.640 | 1.524 | 0.17 |
| Ex. 14 | 81 | 109 | 28 | 0.14 | 1.654/1.649 | 1.519 | 0.07 |
| C. Ex. 6 | 81 | 113 | 32 | 0.12 | 1.655/1.652 | 1.517 | 0.05 |

TABLE 8

|  | Deep drawability | | Impact resistance | Resistance to heat embrittlement | Retort resistance | Taste retention properties | | Overall evaluation |
|---|---|---|---|---|---|---|---|---|
|  | 1 | 2 |  |  |  | 1 | 2 |  |
| C. Ex. 5 | ○ | ○ | ○ | ○ | ○ | ◉ | △ | △ |
| Ex. 13 | ○ | ○ | ○ | ○ | ○ | ◉ | ◉ | ◉ |
| Ex. 14 | ○ | ○ | ○ | ○ | ○ | ◉ | ◉ | ◉ |
| C. Ex. 6 | ○ | × | — | — | — | — | — | × |

"—" In the Table indicates that evaluation was not made.

EXAMPLES 15 TO 18

Biaxially oriented polyester films having characteristic properties shown in Table 10 (particularly X-ray diffraction intensity ratio and refractive index in a film plane direction were changed) were obtained in the same manner as in Example 9 except that stretching and heat setting conditions were changed as shown in Table 9.

The results are shown in Table 11. The films of the present invention which had an X-ray diffraction intensity ratio of 0.10 to 0.40 and a refractive index in a film plane direction of 1.620 to 1.670 in all directions obtained good results. The overall evaluations are shown in Table 11.

TABLE 9

|  | Longitudinal stretching conditions | | Transverse stretching conditions | | Heat setting temperature (°C.) |
|---|---|---|---|---|---|
|  | Stretch ratio | Temperature(°C.) | Stretch ratio | Temperature(°C.) |  |
| Ex. 15 | 3.4 | 130 | 3.6 | 135 | 160 |
| Ex. 16 | 3.0 | 125 | 3.1 | 130 | 200 |
| Ex. 17 | 2.8 | 125 | 3.3 | 130 | 190 |
| Ex. 18 | 2.8 | 120 | 3.4 | 120 | 170 |

TABLE 10

| | Tg (° C.) | Te (° C.) | Te-Tg (° C.) | X-ray diffraction intensity ratio | Refractive index Film plane direction (Max/Min) | Thickness direction | Quantity of extract with water-1 (mg/inch$^2$) |
|---|---|---|---|---|---|---|---|
| Ex. 15 | 81 | 107 | 26 | 0.12 | 1.661/1.649 | 1.515 | 0.10 |
| Ex. 16 | 81 | 98 | 17 | 0.38 | 1.638/1.630 | 1.536 | 0.23 |
| Ex. 17 | 81 | 102 | 21 | 0.24 | 1.660/1.628 | 1.526 | 0.17 |
| Ex. 18 | 81 | 106 | 25 | 0.21 | 1.667/1.632 | 1.521 | 0.11 |

TABLE 11

| | Deep drawability 1 | Deep drawability 2 | Impact resistance | Resistance to heat embrittlement | Retort resistance | Taste retention properties 1 | Taste retention properties 2 | Overall evaluation |
|---|---|---|---|---|---|---|---|---|
| Ex. 15 | ◯ | ◯ | ◯ | ◯ | ◯ | ⊙ | ⊙ | ⊙ |
| Ex. 16 | ◯ | ◯ | ◯ | ◯ | ◯ | ⊙ | ⊙ | ⊙ |
| Ex. 17 | ◯ | ◯ | ◯ | ◯ | ◯ | ⊙ | ⊙ | ⊙ |
| Ex. 18 | ◯ | ◯ | ◯ | ◯ | ◯ | ⊙ | ⊙ | ⊙ |

EXAMPLES 19 TO 23 AND COMPARATIVE EXAMPLES 7 AND 8

Copolyethylene terephthalates (containing 0.2 wt % of spherical silica having an intrinsic viscosity of 0.64, a particle diameter ratio of 1.1 and an average particle diameter of 0.5 μm) prepared by copolymerizing components shown in Table 12 were dried, melt extruded and quenched to be solidified to obtain unstretched films. The unstretched films were stretched in a longitudinal direction at stretch ratios and temperatures shown in Table 12 and then in a transverse direction at stretch ratios and temperatures shown in Table 12, and further heat set at 170° C. to obtain biaxially oriented polyester films.

The thickness of each of the obtained films was 25 μm. The glass transition temperatures (Tg), highest peak temperatures of loss elastic moduli (Te), X-ray diffraction intensity ratios, plane orientation coefficients, refractive indices in a film thickness direction and quantities of extracts with water-1 of the films are shown in Table 13, and the evaluation results are shown in Table 14.

TABLE 12

| | Copolymer component | Copolymerization ratio (mol %) | Melting point (° C.) | Longitudinal stretching conditions Stretch ratio | Longitudinal stretching conditions Temperature (° C.) | Transverse stretching conditions Stretch ratio | Transverse stretching conditions Temperature (° C.) |
|---|---|---|---|---|---|---|---|
| C. Ex. 7 | NDC | 20 | 208 | 3.4 | 100 | 3.5 | 110 |
| Ex. 19 | NDC | 18 | 213 | 3.4 | 110 | 3.5 | 110 |
| Ex. 20 | NDC | 10 | 232 | 3.3 | 120 | 3.4 | 130 |
| Ex. 21 | NDC | 6 | 242 | 2.9 | 125 | 3.0 | 130 |
| C. Ex. 8 | NDC | 4 | 248 | 2.7 | 120 | 2.9 | 125 |
| Ex. 22 | CHDM | 12 | 229 | 3.2 | 125 | 3.3 | 130 |
| Ex. 23 | IA | 6 | 228 | 3.2 | 125 | 3.3 | 135 |
| | NDC | 6 | | | | | |

TABLE 13

| | Tg (° C.) | Te (° C.) | Te-Tg (° C.) | X-ray diffraction intensity ratio | Plane orientation coefficient | Refractive index in thickness direction | Quantity of extract with water-1 (mg/inch²) |
|---|---|---|---|---|---|---|---|
| C. Ex. 7 | 84 | 100 | 16 | 0.37 | 0.106 | 1.542 | 0.19 |
| Ex. 19 | 83 | 103 | 20 | 0.34 | 0.104 | 1.541 | 0.14 |
| Ex. 20 | 81 | 107 | 26 | 0.19 | 0.138 | 1.516 | 0.10 |
| Ex. 21 | 80 | 107 | 27 | 0.14 | 0.135 | 1.514 | 0.09 |
| C. Ex. 8 | 79 | 107 | 28 | 0.16 | 0.132 | 1.513 | 0.09 |
| Ex. 22 | 79 | 102 | 23 | 0.24 | 0.116 | 1.519 | 0.18 |
| Ex. 23 | 78 | 99 | 21 | 0.25 | 0.116 | 1.523 | 0.21 |

TABLE 14

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| C. Ex. 7 | ◯ | ◯ | ◯ | ◯ | ◯ | ◯ | Δ | Δ |
| Ex. 19 | ◯ | ◯ | ◯ | ◯ | ◯ | ⊚ | ◯ | ⊚ |
| Ex. 20 | ◯ | ◯ | ◯ | ◯ | ◯ | ⊚ | ⊚ | ⊚ |
| Ex. 21 | ◯ | ◯ | ◯ | ◯ | ◯ | ⊚ | ⊚ | ⊚ |
| C. Ex. 8 | Δ | × | — | — | — | — | — | × |
| Ex. 22 | ◯ | ◯ | ◯ | ◯ | ◯ | ⊚ | ◯ | ⊚ |
| Ex. 23 | ◯ | ◯ | ◯ | ◯ | ◯ | ◯ | ◯ | ◯ |

"—" in the Table indicates that evaluation was not made.

EXAMPLES 24 AND 25 AND COMPARATIVE EXAMPLES 9 AND 10

Copolyethylene terephthalates (containing 0.2 wt % of spherical silica having an intrinsic viscosity of 0.62, a particle diameter ratio of 1.1 and an average particle diameter of 0.5 μm) prepared by copolymerizing components shown in Table 15 were dried, melt extruded and quench solidified to obtain unstretched films. The unstretched films were drawn and heat set under conditions shown in Table 15 to obtain biaxially oriented polyester films.

The thickness of each of the obtained films was 25 μm. The glass transition temperatures (Tg), highest peak temperatures of loss elastic moduli (Te), X-ray diffraction intensity ratios, plane orientation coefficient s, refractive indices in a film thickness direction and quantities of extracts with ion exchange water-1 of the films are shown in Table 16.

The evaluation results are shown in Table 16. The films of the present invention which had a Tg of 78° C. or higher and a Te–Tg of 30° C. or lower obtained good results. The film which had a Tg of lower than 78° C. (Comparative Example 9) had poor heat resistance and taste and flavor retention properties after a retort treatment and the film which had a Te–Tg of higher than 30° C. (Comparative Example 10) had poor moldability.

TABLE 15

| | Copolymer component | Copolymerization ratio (mole %) | Melting point (° C.) | Longitudinal stretching conditions | | Transverse stretching conditions | | Heat setting temperature (° C.) |
|---|---|---|---|---|---|---|---|---|
| | | | | Stretch ratio | Temperature (° C.) | Stretch ratio | Temperature (° C.) | |
| C. Ex. 9 | IA | 8 | 228 | 3.1 | 110 | 3.2 | 115 | 180 |
| | NPC | 4 | | | | | | |
| Ex. 24 | IA | 4 | 228 | 3.2 | 115 | 3.3 | 120 | 180 |
| | NDC | 8 | | | | | | |
| Ex. 25 | NDC | 10 | 232 | 3.3 | 110 | 3.4 | 120 | 190 |
| C. Ex. 10 | NDC | 10 | 232 | 3.5 | 125 | 3.6 | 130 | 190 |

TABLE 16

|  | Tg (° C.) | Te (° C.) | Te-Tg (° C.) | X-ray diffraction intensity ratio | Plane orientation coefficient | Refractive index in thickness direction | Quantity of extract with water-1 (mg/inch$^2$) |
| --- | --- | --- | --- | --- | --- | --- | --- |
| C. Ex. 9 | 77 | 100 | 23 | 0.22 | 0.121 | 1.519 | 0.21 |
| Ex. 24 | 79 | 104 | 25 | 0.21 | 0.124 | 1.521 | 0.15 |
| Ex. 25 | 81 | 109 | 28 | 0.14 | 0.133 | 1.519 | 0.08 |
| C. Ex. 10 | 81 | 113 | 32 | 0.12 | 0.137 | 1.517 | 0.05 |

TABLE 17

|  | Deep drawability | | Impact resistance | Resistance to heat embrittlement | Retort resistance | Taste retention properties | | Overall evaluation |
| --- | --- | --- | --- | --- | --- | --- | --- | --- |
|  | 1 | 2 |  |  |  | 1 | 2 |  |
| C. Ex. 9 | ○ | ○ | ○ | ○ | ○ | ⊚ | △ | △ |
| Ex. 24 | ○ | ○ | ○ | ○ | ○ | ⊚ | ⊚ | ⊚ |
| Ex. 25 | ○ | ○ | ○ | ○ | ○ | ⊚ | ⊚ | ⊚ |
| C. Ex. 10 | ○ | × | — | — | — | — | — | × |

"—" in the Table indicates that evaluation was not made.

EXAMPLES 26 TO 29

Biaxially oriented polyester films having characteristic properties shown in Table 19 (particularly X-ray diffraction intensity ratio and plane orientation coefficient were changed) were obtained in the same manner as in Example 20 except that drawing and heat setting conditions were changed as shown in Table 18.

The results are shown in Table 20. The films of the present invention which had an X-ray diffraction intensity ratio of 0.10 to 0.40 and a plane orientation coefficient of 0.100 to 0.150 obtained good results. The overall evaluations are shown in Table 20.

TABLE 18

|  | Longitudinal draw conditions | | Transverse draw conditions | | Heat setting temperature (°C.) |
| --- | --- | --- | --- | --- | --- |
|  | Stretch ratio | Temperature(°C.) | Stretch ratio | Temperature(°C.) |  |
| Ex. 26 | 3.3 | 125 | 3.4 | 130 | 160 |
| Ex. 27 | 2.8 | 120 | 3.0 | 125 | 190 |
| Ex. 28 | 3.1 | 125 | 3.2 | 130 | 200 |
| Ex. 29 | 3.1 | 100 | 3.2 | 105 | 170 |

TABLE 19

|  | Tg (° C.) | Te (° C.) | Te-Tg (° C.) | X-ray diffraction intensity ratio | Plane orientation coefficient | Refractive index in thickness direction | Quantity of extract with water-1 (mg/inch$^2$) |
| --- | --- | --- | --- | --- | --- | --- | --- |
| Ex. 26 | 81 | 107 | 26 | 0.12 | 0.140 | 1.515 | 0.08 |
| Ex. 27 | 81 | 99 | 18 | 0.38 | 0.106 | 1.532 | 0.20 |
| Ex. 28 | 81 | 94 | 13 | 0.36 | 0.102 | 1.534 | 0.27 |
| Ex. 29 | 81 | 107 | 26 | 0.15 | 0.148 | 1.511 | 0.11 |

TABLE 20

|  | Deep drawability | | Impact resistance | Resistance to heat embrittlement | Retort resistance | Taste retention properties | | Overall evaluation |
| --- | --- | --- | --- | --- | --- | --- | --- | --- |
|  | 1 | 2 |  |  |  | 1 | 2 |  |
| Ex. 26 | ○ | ○ | ○ | ○ | ○ | ⊚ | ⊚ | ⊚ |
| Ex. 27 | ○ | ○ | ○ | ○ | ○ | ⊚ | ⊚ | ⊚ |

TABLE 20-continued

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| Ex. 28 | ○ | ○ | ○ | ○ | ○ | ⊚ | ⊚ | ⊚ |
| Ex. 29 | ○ | ○ | ○ | ○ | ○ | ⊚ | ⊚ | ⊚ |

EXAMPLES 30 TO 34 AND COMPARATIVE EXAMPLE 11

Copolyethylene terephthalates (containing 0.2 wt % of spherical silica having an intrinsic viscosity of 0.64, a particle diameter ratio of 1.1 and an average particle diameter of 0.5 μm) prepared by copolymerizing components shown in Table 21 were dried, melt extruded and quench solidified to obtain unstretched films. The unstretched films were drawn in a longitudinal direction at stretch ratios and temperatures shown in Table 21 and then in a transverse direction at stretch ratios and temperatures shown in Table 21, and further heat set at 170° C. to obtain biaxially oriented polyester films.

The thickness of each of the obtained films was 25 μm. The glass transition temperatures (Tg), highest peak temperatures of loss elastic moduli (Te), X-ray diffraction intensity ratios, sub-peaks measured by DSC (Tsm), refractive indices in a film thickness direction and quantities of extracts with ion exchange water-1 of the films are shown in Table 22, and the evaluation results are shown in Table 23.

TABLE 21

| | Copolymer component | Copolymerization ratio (mole %) | Melting point (° C.) | Longitudinal draw conditions | | Transverse draw conditions | |
|---|---|---|---|---|---|---|---|
| | | | | Stretch ratio | Temperature (° C.) | Stretch ratio | Temperature (° C.) |
| C. Ex. 11 | NDC | 20 | 208 | 3.6 | 110 | 3.6 | 115 |
| Ex. 30 | NDC | 18 | 213 | 3.5 | 115 | 3.6 | 115 |
| Ex. 31 | NDC | 12 | 228 | 3.2 | 110 | 3.3 | 120 |
| Ex. 32 | NDC | 6 | 242 | 2.8 | 120 | 2.9 | 125 |
| Ex. 33 | CHDM | 12 | 229 | 3.1 | 115 | 3.2 | 125 |
| Ex. 34 | IA<br>NDC | 6<br>6 | 228 | 3.1 | 120 | 3.2 | 130 |

TABLE 22

| | Tg (° C.) | Te (° C.) | Te-Tg (° C.) | X-ray diffraction intensity ratio | Sub-peak measured by DSC (° C.) | Refractive index in thickness direction | Quantity of extract with water-1 (mg/inch²) |
|---|---|---|---|---|---|---|---|
| C. Ex. 11 | 84 | 100 | 16 | 0.38 | 170 | 1.543 | 0.18 |
| Ex. 30 | 83 | 103 | 20 | 0.35 | 170 | 1.541 | 0.14 |
| Ex. 31 | 81 | 107 | 26 | 0.19 | 169 | 1.519 | 0.10 |
| Ex. 32 | 80 | 107 | 27 | 0.15 | 168 | 1.514 | 0.10 |
| Ex. 33 | 79 | 102 | 23 | 0.24 | 169 | 1.519 | 0.20 |
| Ex. 34 | 78 | 98 | 20 | 0.25 | 169 | 1.523 | 0.23 |

TABLE 23

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| C. Ex. 11 | ○ | ○ | ○ | ○ | ○ | ○ | Δ | Δ |
| Ex. 30 | ○ | ○ | ○ | ○ | ○ | ⊚ | ○ | ⊚ |
| Ex. 31 | ○ | ○ | ○ | ○ | ○ | ⊚ | ⊚ | ⊚ |

TABLE 23-continued

|  | Deep drawability | | Impact resistance | Resistance to heat embrittlement | Retort resistance | Taste retention properties | | Overall evaluation |
| --- | --- | --- | --- | --- | --- | --- | --- | --- |
|  | 1 | 2 |  |  |  | 1 | 2 |  |
| Ex. 32 | ◯ | ◯ | ◯ | ◯ | ◯ | ◎ | ◎ | ◎ |
| Ex. 33 | ◯ | ◯ | ◯ | ◯ | ◯ | ◎ | ◯ | ◎ |
| Ex. 34 | ◯ | ◯ | ◯ | ◯ | ◯ | ◯ | ◯ | ◯ |

As is evident from Table 23, the films of the present invention (Examples 30 to 34) made from copolyesters having a melting point of 210 to 245° C. obtained good results whereas the film made from a copolyester having a melting point of lower than 210° C. had poor heat resistance and taste and flavor retention properties after a retort treatment (Comparative Example 11).

EXAMPLES 35 AND 36 AND COMPARATIVE EXAMPLES 12 AND 13

Copolyethylene terephthalates (containing 0.2 wt % of spherical silica having an intrinsic viscosity of 0.62, a particle diameter ratio of 1.1 and an average particle diameter of 0.5 μm) prepared by copolymerizing components shown in Table 24 were dried, melt extruded and quench solidified to obtain unstretched films. The unstretched films were drawn and heat set under conditions shown in Table 24 to obtain biaxially oriented polyester films.

The thickness of each of the obtained films was 25 μm. The glass transition temperatures (Tg), highest peak temperatures of loss elastic moduli (Te), X-ray diffraction intensity ratios, sub-peaks measured by DSC (Tsm), refractive indices in a film thickness direction and quantities of extracts with ion exchange water-1 of the films are shown in Table 25.

The evaluation results are shown in Table 26. The films of the present invention (Examples 35 and 36) which had a Tg of 78° C. or higher and a Te–Tg of 30° C. or lower obtained good results. The film which had a Tg of lower than 78° C. (Comparative Example 12) had poor heat resistance and taste and flavor retention properties after a retort treatment and the film which had a Te–Tg of higher than 30° C. (Comparative Example 13) had poor moldability.

TABLE 24

|  | Copolymer component | Copolymerization ratio (mole %) | Melting point (° C.) | Longitudinal draw conditions | | Transverse draw conditions | | Heat setting temperature (° C.) |
| --- | --- | --- | --- | --- | --- | --- | --- | --- |
|  |  |  |  | Stretch ratio | Temperature (° C.) | Stretch ratio | Temperature (° C.) |  |
| C. Ex. 12 | IA | 8 | 228 | 3.1 | 115 | 3.2 | 120 | 180 |
|  | NDC | 4 |  |  |  |  |  |  |
| Ex. 35 | IA | 4 | 228 | 3.1 | 120 | 3.2 | 125 | 180 |
|  | NDC | 8 |  |  |  |  |  |  |
| Ex. 36 | NDC | 12 | 228 | 3.2 | 100 | 3.3 | 110 | 190 |
| C. Ex. 13 | NDC | 12 | 228 | 3.4 | 115 | 3.6 | 125 | 190 |

TABLE 25

|  | Tg (° C.) | Te (° C.) | Te-Tg (° C.) | X-ray diffraction intensity ratio | Sub-peak measured by DSC (° C.) | Refractive index in thickness direction | Quantity of extract with water-1 (mg/inch$^2$) |
| --- | --- | --- | --- | --- | --- | --- | --- |
| C. Ex. 12 | 77 | 98 | 21 | 0.25 | 179 | 1.521 | 0.20 |
| Ex. 35 | 79 | 102 | 23 | 0.24 | 179 | 1.524 | 0.18 |
| Ex. 36 | 81 | 109 | 28 | 0.14 | 188 | 1.521 | 0.08 |
| C. Ex. 13 | 81 | 113 | 32 | 0.12 | 188 | 1.519 | 0.04 |

TABLE 26

|  | Deep drawability | | Impact resistance | Resistance to heat embrittlement | Retort resistance | Taste retention properties | | Overall evaluation |
| --- | --- | --- | --- | --- | --- | --- | --- | --- |
|  | 1 | 2 |  |  |  | 1 | 2 |  |
| C. Ex. 12 | ○ | ○ | ○ | ○ | ○ | ⊙ | Δ | Δ |
| Ex. 35 | ○ | ○ | ○ | ○ | ○ | ⊙ | ⊙ | ⊙ |
| Ex. 36 | ○ | ○ | ○ | ○ | ○ | ⊙ | ⊙ | ⊙ |
| C. Ex. 13 | ○ | × | — | — | — | — | — | × |

"—" in the Table indicates that evaluation was not made.

EXAMPLES 37 TO 40

Biaxially oriented polyester films having characteristic properties shown in Table 28 (particularly X-ray diffraction intensity ratio and sub-peak measured by DSC (Tsm) were changed) were obtained in the same manner as in Example 31 except that drawing and heat setting conditions were changed as shown in Table 27.

The results are shown in Table 29. The films of the present invention which had an X-ray diffraction intensity ratio of 0.10 to 0.40 and a sub-peak measured by DSC (Tsm) of 150 to 205° C. obtained good results. The overall evaluations are shown in Table 29.

TABLE 27

|  | Longitudinal draw conditions | | Transverse draw conditions | | Heat setting temperature (°C.) |
| --- | --- | --- | --- | --- | --- |
|  | Stretch ratio | Temperature(°C.) | Stretch ratio | Temperature(°C.) |  |
| Ex. 37 | 3.4 | 125 | 3.6 | 130 | 160 |
| Ex. 38 | 3.0 | 120 | 3.1 | 125 | 200 |
| Ex. 39 | 3.2 | 110 | 3.3 | 120 | 155 |
| Ex. 40 | 3.2 | 110 | 3.3 | 120 | 205 |

EXAMPLES 41 TO 47 AND COMPARATIVE EXAMPLES 14 TO 16

Copolyethylene terephthalates (containing 0.2 wt % of spherical silica having an intrinsic viscosity of 0.64, a particle diameter ratio of 1.1 and an average particle diameter of 0.5 μm) prepared by copolymerizing components shown in Table 30 were dried, melt extruded and quench solidified to obtain unstretched films. The unstretched films were drawn in a longitudinal direction at stretch ratios and temperatures shown in Table 30 and then in a transverse direction at stretch ratios and temperatures shown in Table 30, and further heat set at 180° C. to obtain biaxially oriented polyester films.

The thickness of each of the obtained films was 25 μm and the evaluation results of these films are shown in Table 31.

TABLE 28

|  | Tg (° C.) | Te (° C.) | Te-Tg (° C.) | X-ray diffraction intensity ratio | Sub-peak measured by DSC (° C.) | Refractive index in thickness direction | Quantity of extract with water-1 (mg/inch$^2$) |
| --- | --- | --- | --- | --- | --- | --- | --- |
| Ex. 37 | 81 | 107 | 26 | 0.12 | 158 | 1.517 | 0.09 |
| Ex. 38 | 81 | 98 | 17 | 0.38 | 199 | 1.538 | 0.22 |
| Ex. 39 | 81 | 107 | 26 | 0.18 | 152 | 1.520 | 0.10 |
| Ex. 40 | 81 | 100 | 19 | 0.33 | 202 | 1.533 | 0.18 |

TABLE 29

|  | Deep drawability | | Impact resistance | Resistance to heat embrittlement | Retort resistance | Taste retention properties | | Overall evaluation |
| --- | --- | --- | --- | --- | --- | --- | --- | --- |
|  | 1 | 2 |  |  |  | 1 | 2 |  |
| Ex. 37 | ○ | ○ | ○ | ○ | ○ | ⊙ | ⊙ | ⊙ |
| Ex. 38 | ○ | ○ | ○ | ○ | ○ | ⊙ | ⊙ | ⊙ |
| Ex. 39 | ○ | ○ | ○ | ○ | ○ | ⊙ | ⊙ | ⊙ |
| Ex. 40 | ○ | ○ | ○ | ○ | ○ | ⊙ | ⊙ | ⊙ |

TABLE 30

| | Copolymer component | Copolymerization ratio (mole %) | Tm (° C.) | Longitudinal draw conditions | | Transverse draw conditions | | Tg (° C.) | Te (° C.) | Te-Tg (° C.) | F40/F120 |
|---|---|---|---|---|---|---|---|---|---|---|---|
| | | | | Stretch ratio | Temperature (° C.) | Stretch ratio | Temperature (° C.) | | | | |
| Ex. 41 | NDC | 18 | 213 | 3.2 | 110 | 3.3 | 120 | 83 | 105 | 17 | 0.78 |
| Ex. 42 | NDC | 10 | 232 | 3.0 | 115 | 3.1 | 125 | 81 | 100 | 19 | 0.75 |
| Ex. 43 | NDC | 10 | 232 | 3.3 | 110 | 3.6 | 120 | 81 | 109 | 28 | 0.62 |
| Ex. 44 | NDC | 6 | 242 | 3.0 | 120 | 3.1 | 130 | 80 | 108 | 28 | 0.63 |
| Ex. 45 | CHDM | 12 | 229 | 3.0 | 110 | 3.1 | 120 | 79 | 102 | 23 | 0.65 |
| Ex. 46 | CHDM | 18 | 212 | 3.2 | 100 | 3.3 | 110 | 80 | 95 | 15 | 0.69 |
| Ex. 47 | IA<br>NDC | 6<br>6 | 228 | 3.0 | 110 | 3.1 | 120 | 78 | 98 | 20 | 0.65 |
| C. Ex. 14 | IA | 6 | 243 | 3.0 | 110 | 31 | 120 | 76 | 103 | 27 | 0.64 |
| C. Ex. 15 | NDC | 20 | 208 | 3.2 | 100 | 3.3 | 110 | 84 | 97 | 13 | 0.78 |
| C. Ex. 16 | NDC | 10 | 232 | 3.2 | 100 | 33 | 110 | 81 | 112 | 32 | 0.67 |

TABLE 31

| | Deep drawability | | Impact resistance | Resistance to heat embrittlement | Retort resistance | Taste retention properties | | Overall evaluation |
|---|---|---|---|---|---|---|---|---|
| | 1 | 2 | | | | 1 | 2 | |
| Ex. 41 | ○ | ○ | ○ | ○ | ○ | ⊚ | ○ | ○ |
| Ex. 42 | ○ | ○ | ○ | ○ | ○ | ⊚ | ○ | ⊚ |
| Ex. 43 | ○ | ○ | ○ | ○ | ○ | ⊚ | ⊚ | ⊚ |
| Ex. 44 | ○ | ○ | ○ | ○ | ○ | ⊚ | ⊚ | ⊚ |
| Ex. 45 | ○ | ○ | ○ | ○ | ○ | ○ | ○ | ○ |
| Ex. 46 | ○ | ○ | ○ | ○ | ○ | ○ | ○ | ○ |
| Ex. 47 | ○ | ○ | ○ | ○ | ○ | ○ | ○ | ○ |
| C. Ex. 14 | ○ | ○ | ○ | ○ | ○ | ⊚ | Δ | Δ |
| C. Ex. 15 | ○ | ○ | ○ | ○ | ○ | ○ | Δ | Δ |
| C. Ex. 16 | ○ | × | — | — | — | — | — | × |

"—" in the Table indicates that evaluation was not made.

EXAMPLES 48 TO 52 AND COMPARATIVE EXAMPLES 17 TO 21

Copolyethylene terephthalates (containing 0.2 wt % of spherical silica having a particle diameter ratio of 1.1 and an average particle diameter of 0.5 μm and may be referred to as PET hereinafter) prepared using acid components, diethylene glycol, alkali metal compound, polycondensation catalyst and phosphorus compound, which are shown in Table 30, were dried, melt extruded at 280° C. and quench solidified to obtain unstretched films. The unstretched films were drawn to 3.0 times in a longitudinal direction and to 3.0 times in a transverse direction, and further heat set at 180° C. to obtain 25 μm-thick biaxially oriented polyester films. The characteristic properties of the films are shown in Table 32 and Table 33.

COMPARATIVE EXAMPLE 22

A biaxially oriented film was obtained in the same manner as in Example 46 except that the melt extrusion temperature was changed to 300° C. in the production of co-PET. The characteristic properties of this film are shown in Table 32 and Table 33. The quantity of a free glycol ester contained in this biaxially oriented film was higher than those of the above Examples.

TABLE 32

| | Characteristic properties of polymer | | | | | | Characteristic properties of film | | Contents of metal and phosphorus contained in film | | | |
|---|---|---|---|---|---|---|---|---|---|---|---|---|
| | Dicarboxylic acid component (molar ratio) | DEG component (mole %) | Tg (° C.) | Tm (° C.) | Polycondensation catalyst | [η] | Quantity of free glycol ester (ppm) | Quantity of extract with water-2 (mg/inch$^2$) | A (ppm) | M (mmol %) | M + P (mmol %) | M/P (mmol %/mmol %) |
| Ex. 48 | TA (90) NDC (10) | 1.5 | 81 | 232 | GeO$_2$ | 0.70 | 20 | 0.05 | 10 | 40 | 60 | 2.0 |
| Ex. 49 | TA (90) NDC (10) | 1.0 | 82 | 231 | Sb$_2$O$_3$ | 0.70 | 20 | 0.05 | 10 | 50 | 75 | 2.0 |

TABLE 32-continued

|  | Characteristic properties of polymer | | | | | | Characteristic properties of film | | Contents of metal and phosphorus contained in film | | | |
|---|---|---|---|---|---|---|---|---|---|---|---|---|
|  | Dicarboxylic acid component (molar ratio) | | DEG component (mole %) | Tg (° C.) | Tm (° C.) | Poly-conden-sation catalyst | [η] | Quantity of free glycol ester (ppm) | Quantity of extract with water-2 (mg/inch²) | A (ppm) | M (mmol %) | M + P (mmol %) | M/P (mmol %/mmol %) |
| Ex. 50 | TA (90) | NDC (10) | 3.0 | 78 | 226 | GeO₂ | 0.70 | 30 | 0.06 | 0 | 30 | 45 | 2.0 |
| Ex. 51 | TA (82) | NDC (18) | 1.5 | 83 | 213 | GeO₂ | 0.70 | 15 | 0.03 | 10 | 40 | 60 | 2.0 |
| Ex. 52 | TA (94) | NDC (6) | 1.5 | 80 | 242 | GeO₂ | 0.70 | 25 | 0.05 | 10 | 40 | 60 | 2.0 |
| C. Ex. 17 | TA (90) | NDC (10) | 1.5 | 81 | 232 | GeO₂ | 0.70 | 60 | 0.20 | 10 | 40 | 60 | 2.0 |
| C. Ex. 18 | TA (75) | NDC (25) | 1.5 | 85 | 196 | GeO₂ | 0.70 | 10 | 0.05 | 10 | 40 | 60 | 2.0 |
| C. Ex. 19 | TA (98) | NDC (2) | 1.5 | 77 | 251 | GeO₂ | 0.70 | 50 | 0.10 | 10 | 40 | 60 | 2.0 |
| C. Ex. 20 | TA (91) | AA (9) | 1.5 | 60 | 228 | GeO₂ | 0.70 | 70 | 0.40 | 10 | 40 | 60 | 2.0 |
| C. Ex. 21 | TA (94) | IA (6) | 1.5 | 76 | 243 | GeO₂ | 0.70 | 55 | 0.10 | 10 | 40 | 60 | 2.0 |
| C. Ex. 22 | TA (90) | NDC (10) | 1.5 | 81 | 232 | GeO₂ | 0.45 | 60 | 0.20 | 10 | 40 | 60 | 2.0 |

Abbreviations in the Table stand for the following substances.
TA: Telephthalic acid, NDC: 2,6-naphthalenedicarboxylic acid, AA: Adipic acid, IA: Isophthalic acid
DEG: Diethylene glycol, Tg: Glass transition point, Tm: Melting point, GeO₂: Germanium dioxide
Sb₂O₃: Antimony trioxide, A: Total quantity of alkali metal elements remaining in film
M: Concentration of catalytic metal element remaining in film
P: Concentration of phosphorus element remaining in film
All the values are obtained by measurements in accordance with the above-described methods. M + P and M/P are obtained by inserting these values.

TABLE 33

| | Lamination properties | | Deep drawability | | Impact resistance | Resistance to heat embrittlement | Retort resistance | Taste retention properties | |
|---|---|---|---|---|---|---|---|---|---|
| | Bubbles wrinkles | Heat shrinkage | 1 | 2 | | | | 1 | 2 |
| Ex. 48 | ○ | ○ | ○ | ○ | ○ | ○ | ○ | ⊚ | ○ |
| Ex. 49 | ○ | ○ | ○ | ○ | ○ | ○ | ○ | ⊚ | ○ |
| Ex. 50 | ○ | ○ | ○ | ○ | ○ | ○ | ○ | ⊚ | ⊚ |
| Ex. 51 | ○ | ○ | ○ | ○ | ○ | ○ | ○ | ⊚ | ○ |
| Ex. 52 | ○ | ○ | ○ | ○ | ○ | ○ | ○ | ○ | ○ |
| C. Ex. 17 | ○ | ○ | ○ | ○ | ○ | ○ | ○ | ○ | Δ |
| C. Ex. 18 | ○ | ○ | ○ | ○ | Δ | Δ | Δ | ○ | × |
| C. Ex. 19 | Δ | × | — | — | — | — | — | — | — |
| C. Ex. 20 | ○ | ○ | ○ | ○ | ○ | ○ | ○ | ○ | Δ |
| C. Ex. 21 | ○ | ○ | ○ | ○ | ○ | ○ | ○ | ⊚ | Δ |
| C. Ex. 22 | ○ | Δ | × | — | — | — | — | — | — |

As is evident from the evaluation results of table 31, cans made by using the copolyester films of the present invention are satisfactory in view of deep drawability, resistance to heat embrittlement, retort resistance and impact resistance and excellent in flavor retention properties, particularly flavor and taste retention properties after a retort treatment.

What is claimed is:

1. A biaxially oriented polyester film to be laminated onto a metal plate and molded, (A) which comprises a copolyester, said copolyester comprising (a) terephthalic acid in an amount of 82 to 100 mol % and 2,6-naphthalenedicarboxylic acid or a combination of 2,6-naphthalenedicarboxylic acid and other dicarboxylic acids in an amount of 0 to 18 mol % of the total of all dicarboxylic acid components and (b) ethylene glycol in an amount of 82 to 100 mol % and cyclohexanedimethanol or a combination of cyclohexanedimethanol and other diols in an amount of 0 to 18 mol % of the total of all diol components, and having (c) a glass transition temperature of 78° C. or higher and (d) a melting point of 210 to 250° C., and (B) which has the following relationship between the highest peak temperature (Te, ° C.) of loss elastic modulus and the glass transition temperature (Tg, ° C.):

Te−Tg≦30.

2. The film of claim 1, wherein all the dicarboxylic acid components of the copolyester consist of terephthalic acid and 2,6-naphthalenedicarboxylic acid and all the diol components of the copolyester consist of ethylene glycol.

3. The film of claim 1, wherein the glass transition temperature of the copolyester is in the range of 78 to 90° C.

4. The film of claim 1, wherein the melting point of the copolyester is in the range of 210 to 245° C.

5. The film of claim 1 which has the following relationship between the highest peak temperature (Te) of loss elastic modulus and the glass transition temperature (Tg):

15≦Te−Tg≦25.

6. The film of claim 1 which has the following relationship between a surface (100) and a surface (1$\bar{1}$0) parallel to the surface of the film:

$$0.10 \leq I(1\bar{1}0)/I(100) \leq 0.40$$

wherein $I(1\bar{1}0)$ is an X-ray diffraction intensity obtained by the surface $(1\bar{1}0)$ and $I(100)$ is an X-ray diffraction intensity obtained by the surface (100).

7. The film of claim 6 which has a refractive index in a film plane direction of 1.620 to 1.670 in all directions.

8. The film of claim 6 which has a plane orientation coefficient of 0.100 to 0.150.

9. The film of claim 6 which has a sub-peak, different from a melting peak, at a temperature range of 150 to 205° C. in DSC.

10. The film of claim 1, wherein in a film plane direction, the tensile stress (F40, kgf/mm$^2$) for a 40% elongation at 100° C. and the tensile stress (F120, kgf/mm$^2$) for a 120% elongation at 100° C. satisfy the following relationship:

$$0.6 \leq F40/F120 \leq 0.8.$$

11. The film of claim 1, wherein the quantity of an extract obtained by an extraction treatment with ion exchange water at 121° C. for 2 hours is 0.5 mg/inch$^2$ (0.0775 mg/cm$^2$) or less.

12. A biaxially oriented polyester film to be laminated onto a metal plate and molded,
    (A) which comprises a copolyester, said copolyester comprising (a) terephthalic acid in an amount of 82 to 100 mol % and 2,6-naphthalenedicarboxylic acid or a combination of 2,6-naphthalenedicarboxylic acid and other dicarboxylic acids in an amount of 0 to 18 mol % of the total of all dicarboxylic acid components and (b) ethylene glycol in an amount of 82 to 100 mol % and cyclohexanedimethanol or a combination of cyclohexanedimethanol and other diols in an amount of 0 to 18 mol % of the total of all diol components, and having (c) a glass transition temperature of 78° C. or higher and (d) a melting point of 210 to 250° C., and
    (B') which contains a free dicarboxylic acid diol ester in an amount of 50 ppm or less.

13. The film of claim 12, wherein ethylene glycol is contained in an amount of 90 mol % or more of the total of all diol components.

14. The film of claim 12, wherein the intrinsic viscosity of the copolyester is in the range of 0.5 to 0.8 dl/g.

15. The film of claim 12, wherein the free dicarboxylic acid diol ester is bis(β-hydroxyethyl)terephthalate.

16. The film of claim 12, wherein the highest peak temperature (Te, ° C.) of loss elastic modulus of the film and the glass transition temperature (Tg, ° C.) of the copolyester satisfy the following relationship:

$$Te-Tg \leq 30.$$

17. The film of claim 12, wherein in a film plane direction, the tensile stress (F40, kgf/mm$^2$) for a 40% elongation at 100° C. and the tensile stress (F120, kgf/mm$^2$) for a 120% elongation at 100° C. satisfy the following relationship:

$$0.6 \leq F40/F120 \leq 0.8.$$

18. The film of claim 12, wherein the quantity of an extract obtained by an extraction treatment with ion exchange water at 125° C. for 1 hour is 0.1 mg/inch$^2$ (0.0155 mg/cm$^2$) or less.

19. The film of claim 12 has the following relationship between a surface (100) and a surface $(1\bar{1}0)$ parallel to the surface of the film:

$$0.10 \leq I(1\bar{1}0)/I(100) \leq 0.40$$

wherein $I(1\bar{1}0)$ is an X-ray diffraction intensity obtained by the surface $(1\bar{1}0)$ and $I(100)$ is an X-ray diffraction intensity obtained by the surface (100).

20. The film of claim 19 which has a refractive index in a film plane direction of 1.620 to 1.670 in all directions.

21. The film of claim 19 which has a plane orientation coefficient of 0.100 to 0.150.

22. The film of claim 19 which has a sub-peak, different from a melting point peak, at a temperature range of 150 to 205° C. in DSC.

23. The film of claim 1 or 12 which has a thickness of 6 to 75 μm.

24. A method for producing a laminated metal plate, in which the laminated metal plate is made by laminating the film of claim 1 or 12 on a metal plate.

25. A method for producing a metal can, in which the metal can is made by deep drawing of the laminated metal plate of claim 24.

* * * * *